(12) United States Patent
Chien

(10) Patent No.: US 9,322,986 B2
(45) Date of Patent: Apr. 26, 2016

(54) OPTICAL FIBER COATING FOR SHORT DATA NETWORK

(71) Applicant: Corning Incorporated, Corning, NY (US)

(72) Inventor: Ching-Kee Chien, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 89 days.

(21) Appl. No.: 14/273,848

(22) Filed: May 9, 2014

(65) Prior Publication Data

US 2014/0376867 A1 Dec. 25, 2014

Related U.S. Application Data

(60) Provisional application No. 61/838,386, filed on Jun. 24, 2013.

(51) Int. Cl.
| | |
|---|---|
| *G02B 6/02* | (2006.01) |
| *C09D 133/14* | (2006.01) |
| *C03C 25/10* | (2006.01) |
| *C09D 4/06* | (2006.01) |
| *G02B 1/04* | (2006.01) |

(52) U.S. Cl.
CPC .......... *G02B 6/02033* (2013.01); *C03C 25/105* (2013.01); *C09D 4/06* (2013.01); *C09D 133/14* (2013.01); *G02B 1/048* (2013.01); *G02B 6/02395* (2013.01)

(58) Field of Classification Search
CPC .......... G02B 6/02033; G02B 6/02395; C03C 25/1065; C03C 25/106; C03C 25/1055; C03C 25/105; C03C 25/1045

USPC .................................................. 385/123, 128
See application file for complete search history.

(56) References Cited

U.S. PATENT DOCUMENTS

| | | | |
|---|---|---|---|
| 4,968,116 A | 11/1990 | Hulme-Lowe et al. | |
| 5,139,816 A | 8/1992 | Eckberg | |
| 5,210,248 A | 5/1993 | Babirad et al. | |
| 5,381,504 A | 1/1995 | Novack et al. | |
| 5,418,016 A | 5/1995 | Cornforth et al. | |

(Continued)

FOREIGN PATENT DOCUMENTS

| | | |
|---|---|---|
| WO | 93/04132 | 3/1993 |
| WO | 00/66636 | 11/2000 |

(Continued)

*Primary Examiner* — Ryan Lepisto
*Assistant Examiner* — Guy Anderson
(74) *Attorney, Agent, or Firm* — Kevin L. Bray

(57) ABSTRACT

A hybrid cladding for optical fibers used in short data networks. The hybrid cladding surrounds a glass waveguide fiber and is surrounded by a primary coating. The hybrid cladding has low adhesion to the primary coating. The low adhesion permits stripping of the primary coating from the hybrid cladding without damaging the hybrid cladding and without leaving residue of the primary coating on the surface of the hybrid cladding. The hybrid cladding may be formed by curing a composition that includes a monomer with a radiation-curable functional group, a slip component, and a photoinitiator. The radiation-curable functional group may be a (meth)acrylate group. The slip component may contain silicon or silicone and may further contain a radiation-curable functional group. Silicone di(meth)acrylate is an illustrative slip component.

17 Claims, 3 Drawing Sheets

(56) References Cited

U.S. PATENT DOCUMENTS

| | | | |
|---|---|---|---|
| 5,891,930 A | 4/1999 | Lapin et al. | |
| 6,048,911 A | 4/2000 | Shustack et al. | |
| 6,339,666 B2* | 1/2002 | Szum | 385/128 |
| 6,350,790 B1* | 2/2002 | Bishop | C03C 25/105 427/496 |
| 6,850,681 B2* | 2/2005 | Lepont | C03C 25/106 385/128 |
| 7,257,299 B2* | 8/2007 | Chien | G02B 6/4482 385/114 |
| 7,289,706 B2* | 10/2007 | Chien | G02B 6/4482 385/114 |
| 7,822,307 B1 | 10/2010 | Tanaka et al. | |
| 8,111,964 B2* | 2/2012 | Nakajima | C03C 25/1065 385/128 |
| 8,218,931 B2 | 7/2012 | Murphy et al. | |
| 8,828,547 B2* | 9/2014 | Mundra | C08G 18/3206 428/423.1 |
| 2002/0102086 A1 | 8/2002 | Fewkes et al. | |
| 2008/0027154 A1* | 1/2008 | Ramsey | A01N 59/14 522/7 |
| 2009/0034928 A1* | 2/2009 | Hodono | G02B 6/138 385/130 |
| 2009/0171011 A1 | 7/2009 | Szum et al. | |
| 2010/0210745 A1* | 8/2010 | McDaniel | C09D 5/008 521/55 |

FOREIGN PATENT DOCUMENTS

| | | | | |
|---|---|---|---|---|
| WO | 03/023101 | 3/2003 | | |
| WO | 2004/024814 | 3/2004 | | |
| WO | WO 2010/002175 A2 * | 1/2010 | | C08L 27/12 |

* cited by examiner ically used acrylate monomers and/or oligomers. The photo-acid-generating compound reacted in the presence of the radiation used to cure the base composition to release an acidic fragment that altered the chemistry of the process to produce a hybrid cladding that led to a significant improvement in the dynamic fatigue resistance of the fiber.

OPTICAL FIBER COATING FOR SHORT DATA NETWORK

This application claims the benefit of priority under 35 U.S.C. §119 of U.S. Provisional Application Ser. No. 61/838,386 filed on Jun. 24, 2013 the content of which is relied upon and incorporated herein by reference in its entirety.

FIELD OF THE DISCLOSURE

This disclosure pertains to coatings for optical fibers. More particularly, this disclosure pertains to coatings for optical fibers used in confined and highly stressed configurations in short data networks. Most particularly, this disclosure pertains to coatings for optical fibers of short data network that can be cleanly stripped for integration with connectors and couplers.

BACKGROUND OF THE DISCLOSURE

Short data networks represent an emerging area of opportunity for optical fibers. In a short data network, the interconnect distance between components is short and space constraints typically require bent or tightly confined configurations for interconnects. In consumer electronic applications, for example, the interconnects may be subject to extremely tight bends (e.g. ≤3 mm radius) for at least a short period of time during use of the device for its intended purpose. As electronic devices and data networks become increasingly miniaturized, market demand for interconnect technologies capable of function under increasingly demanding conditions will continue to grow.

Adaptation of optical fibers to short data networks has heretofore been limited due to fatigue associated with internal stresses that arise within optical fibers when installed in confined or bent configurations. To expand the use of optical fibers in short data networks, it is necessary to develop fibers that resist fatigue and maintain performance when utilized in highly-stressed configurations.

One strategy for increasing the fatigue resistance of optical fibers was proposed in U.S. Published Patent Appl. No. 2011/0300367. In this application, an inner coating layer was included in the design of a coated fiber to improve fatigue resistance. The inner coating functioned as a hybrid cladding and was placed between the glass cladding and the intermediate (primary) coating. The hybrid cladding had a thickness of ~20 μm or less and was formed by curing a composition that included a photo-curable base composition and a photo-acid-generating compound. The photo-curable base composition typically included acrylate monomers and/or oligomers. The photo-acid-generating compound reacted in the presence of the radiation used to cure the base composition to release an acidic fragment that altered the chemistry of the process to produce a hybrid cladding that led to a significant improvement in the dynamic fatigue resistance of the fiber.

In addition to fatigue resistance, fibers suitable for short data networks need to be amenable to standard fiber assembly processes to interface the fibers to the couplers and connectors needed to form interconnects between components within devices or between devices in a network. The first step in the fiber assembly process is to thermally strip away the primary and secondary coatings. Temperatures reached during standard stripping processes can reach 150° C. to 200° C. In order to implement hybrid claddings as a strategy for improving fatigue resistance, the hybrid cladding must be compatible with standard thermal stripping processes. It must be possible to strip the primary coating from the hybrid cladding without damaging the hybrid cladding or leaving residue of the primary coating on the hybrid cladding. If the hybrid cladding is damaged in the stripping operation or residue from the primary coating remains on the hybrid cladding, it becomes difficult to (1) insert the stripped fiber into ferrules and (2) affix connectors to the stripped fiber. The hybrid cladding must also be stable at customary stripping temperatures. Current optical fibers used in short data networks have poor stripping characteristics. There remains a need to develop optical fibers with the fatigue resistance needed for short data networks that are compatible with conventional stripping processes.

SUMMARY

The present disclosure provides optical fibers with excellent fatigue resistance and excellent compatibility with conventional stripping processes. The fibers may include a glass core, a glass cladding, and a hybrid cladding. The fibers may further optionally include a primary coating and a secondary coating. The adhesive strength between the hybrid cladding and the primary coating may be controlled to permit clean stripping of the primary coating at conventional stripping temperatures. The hybrid cladding may also have high thermal stability, a high glass transition temperature ($T_g$), and a high modulus at customary stripping temperatures.

The hybrid cladding may be formed by curing a composition that may include a monomer, an oligomer, a photoinitiator, and a slip component. The composition may also include a photo-acid-generating compound. The monomer may be monofunctional or polyfunctional. The monomer may include a radiation-curable functional group. The radiation-curable functional group of the monomer may include a (meth)acrylate group. The oligomer may be monofunctional or polyfunctional. The oligomer may include a radiation-curable functional group. The radiation-curable functional group of the oligomer may include a (meth)acrylate group. The oligomer may include a urethane linkage or a urea linkage.

The slip component may include a silicone compound, or a silicone compound with one or more radiation-curable functional groups. The slip component may include a silicone (meth)acrylate compound, or a silicone di(meth)acrylate compound, or a silicone tri(meth)acrylate compound, or a silicone tetra(meth)acrylate compound. The slip component may influence the strength of adhesion between the hybrid cladding and the primary coating. The slip component may modify the strength of adhesion to permit clean stripping of the primary coating from the hybrid cladding.

The slip component may be present in the composition used to form the hybrid cladding in an amount from 1 wt % to 30 wt %, or from 5 wt % to 15 wt %, or from 8 wt % to 12 wt %, or about 10 wt %.

When used in conjunction with a surrounding primary and/or secondary coating, the hybrid cladding may have a thickness or radial thickness of at least 2.5 μm, or at least 5 μm, or at least 10 μm, or at least 15 μm, or at least 20 μm, or at least 25 μm, or between 2.5 μm and 30 μm, or between 5 μm and 25 μm or between 10 μm and 20 μm, or between 5 μm and 15 μm.

When used as the outer layer of the fiber in the absence of a primary or secondary coating, the hybrid cladding may directly contact the glass cladding and extend to an outer radius of at least 75 μm to provide a fiber with an outer diameter of at least 150 μm, or to an outer radius of at least 90 μm to provide a fiber with an outer diameter of at least 180 μm, or to an outer radius of at least 100 μm to provide a fiber with an outer diameter of at least 200 µm, or to an outer radius of at least 122.5 µm to provide a fiber with an outer diameter of at least 245 µm, or to an outer radius of between 100 µm and 122.5 µm to provide a fiber with an outer diameter of between 200 µm and 245 µm.

The hybrid cladding may have high thermal stability and maintain a sufficiently high modulus at customary stripping temperatures to remain intact and undamaged during the stripping operation. The hybrid cladding may have a sufficiently high glass transition temperature to remain rigid and provide a protective function in the conditions of the typical operating environment for the optical fiber.

The hybrid cladding may have a Young's modulus at 25° C. of at least 1500 MPa, or at least 1800 MPa, or at least 2100 MPa, or at least 2400 MPa, or at least 2700 MPa, or at least 3000 MPa, or between 1800 MPa and 3300 MPa, or between 2100 MPa and 3000 MPa.

The hybrid cladding may have an elastic modulus at 25° C. of at least 1200 MPa, or at least 1500 MPa, or at least 1800 MPa, or at least 2100 MPa, or at least 2400 MPa, or at least 2700 MPa, or at least 3000 MPa, or at least 3300 MPa, or between 1300 MPa and 3500 MPa, or between 1300 MPa and 3000 MPa, or between 1300 MPa and 2500 MPa, or between 2100 MPa and 3200 MPa, or between 2200 MPa and 2800 MPa.

The hybrid cladding may have an elastic modulus at 100° C. of at least 300 MPa, or at least 500 MPa, or at least 700 MPa, or at least 900 MPa, or at least 1200 MPa, or at least 1500 MPa, or at least 1800 MPa, or at least 2100 MPa, or between 300 MPa and 2500 MPa, or between 400 MPa and 2000 MPa, or between 500 MPa and 1700 MPa.

The hybrid cladding may have an elastic modulus at 150° C. of at least 100 MPa, or at least 200 MPa, or at least 300 MPa, or at least 400 MPa, or at least 500 MPa, or at least 1000 MPa, or at least 1500 MPa, or at least 2000 MPa, or between 100 MPa and 2500 MPa, or between 300 MPa and 1500 MPa, or between 500 MPa and 1000 MPa.

The hybrid cladding may have an elastic modulus at 200° C. of at least 50 MPa, or at least 100 MPa, or at least 150 MPa, or at least 200 MPa, or at least 250 MPa, or at least 300 MPa, or at least 500 MPa, or at least 1000 MPa, or between 50 MPa and 2000 MPa, or between 100 MPa and 1000 MPa, or between 150 MPa and 800 MPa, or between 150 MPa and 500 MPa.

The hybrid cladding may have a glass transition temperature of at least 40° C., or at least 50° C., or at least 60° C., or at least 70° C., or at least 80° C., or at least 85° C., or at least 90° C., or at least 95° C., or at least 100° C., or at least 105° C.

The thermal stability of the hybrid cladding may be assessed by the weight loss it experiences when exposed to high temperatures. As measured in a TGA experiment in which the hybrid cladding is heated in air at 10° C./minute from ambient temperature to 700° C., the weight loss of the hybrid cladding of the present disclosure may be 10% or less at a temperature of up to 330° C., or a temperature up to 345° C., or a temperature up to 360° C. As measured in a TGA experiment in which the hybrid cladding is heated in air at 10° C./minute from ambient temperature to 700° C., the weight loss of the hybrid cladding of the present disclosure may be 20% or less at a temperature of up to 360° C., or a temperature up to 380° C., or a temperature up to 400° C. As measured in a TGA experiment in which the hybrid cladding is heated in air at 10° C./minute from ambient temperature to 700° C., the weight loss of the hybrid cladding of the present disclosure may be 30% or less at a temperature of up to 380° C., or a temperature up to 400° C., or a temperature up to 420° C. The weight loss of the hybrid cladding may be 10% or less at a temperature of up to 330° C., or a temperature up to 345° C., or a temperature up to 360° C. The weight loss of the hybrid cladding may be 20% or less at a temperature of up to 360° C., or a temperature up to 380° C., or a temperature up to 400° C. The weight loss of the hybrid cladding may be 30% or less at a temperature of up to 380° C., or a temperature up to 400° C., or a temperature up to 420° C.

The composition from which the hybrid cladding is formed may include a photo-acid-generating compound. When exposed to the radiation used to cure the composition, the photo-acid-generating compound may undergo bond cleavage to release an acid group. Relative to analogous hybrid claddings formed in the absence of a photo-acid-generating compound, the present hybrid cladding may provide greater resistance of the glass fiber to fatigue in stressed or bent configurations.

The photo-acid-generating compound may be an onium salt, or an onium salt with an anion based on a halogenated divalent to heptavalent metal or non-metal, an onium salt that releases HF or F, an onium salt with an anion based on fluorinated (including highly fluorinated and perfluorinated) tris alkyl- or arylsulfonyl methides and corresponding bis alkyl- or arylsulfonyl imides, diaryl-diazonium salts, onium salts of group Va and B, Ia and B and I of the periodic table; halonium salts, quaternary ammonium, phosphonium and arsonium salts, aromatic sulfonium salts, sulfoxonium salts, or selenium salts.

The photo-acid-generating compound maybe a non-ionic compound, such as imidosulfonates; oxime sulfonates; N-oxyimidosulfonates; disulfones including α,α-methylene-disulfones and disulfonehydrazines; diazosulfones; N-sulfonyloxyimides; nitrobenzyl compounds; and halogenated compounds.

The photo-acid-generating compound may be an iron arene complex.

The photo-acid-generating compound may be present in an amount from about 0.1 pph to about 10 pph, or from about 0.5 pph up to about 8 pph, or from about 1 pph up to about 7 pph.

The primary coating may be formed from a composition that includes a monomer and a photoinitiator. The primary coating composition may also include an oligomer. The primary coating composition may be radiation curable. The monomer and/or oligomer may include a radiation-curable functional group. The radiation-curable functional group may be an acrylate or methacrylate group.

The outer diameter of the primary coating may be about 180 µm, or about 185 µm, or about 190 µm, or about 195 µm, or about 200 µm. The primary coating may have a lower Young's modulus than the hybrid cladding. The Young's modulus of the primary coating may be less than 10 MPa, or less than 5 MPa, or less than 2.5 MPa, or less than 1 MPa.

The secondary coating may be formed from a composition that includes a monomer and a photoinitiator. The secondary coating composition may also include an oligomer. The secondary coating composition may be radiation curable. The monomer and/or oligomer may include a radiation-curable functional group. The radiation-curable functional group may be an acrylate or methacrylate group. The monomer and/or oligomer may include a urethane linkage, or a urea linkage.

The outer diameter of the secondary coating may be about 210 µm, or about 220 µm, or about 230 µm, or about 240 µm, or about 250 µm. The Young's modulus of the secondary coating may be greater than 500 MPa, or greater than 1000 MPa, or greater than 1250 MPa, or greater than 1500 MPa, or greater than 1750 MPa.

The hybrid cladding may have a higher elastic modulus than the primary coating. The hybrid cladding may have a lower elastic modulus than the secondary coating.

The primary and secondary coatings may be cleanly stripped from the hybrid cladding at temperatures above 50° C., or above 100° C., or above 150° C., or above 200° C. The stripping may occur without damaging the hybrid cladding and without leaving residue from the primary or secondary coating on the surface of the hybrid cladding.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

The present disclosure provides an optical fiber for short data networks. The optical fiber is adapted to installation in a spatially confined or high stress environment. The installation environment may be within a computer or other device, or between different devices. The optical fiber may serve as an interconnect between devices or components within or between computing or data devices and may serve as a link to transfer data between devices.

The optical fiber may include a glass waveguide, a hybrid cladding surrounding the glass waveguide, and a primary coating surrounding the hybrid cladding. The glass waveguide may include a glass core surrounded by a glass cladding. The hybrid cladding may be in direct contact with the glass cladding. The hybrid cladding may be in direct contact with the primary coating. The optical fiber may include a secondary coating surrounding the primary coating.

Figure 1A:
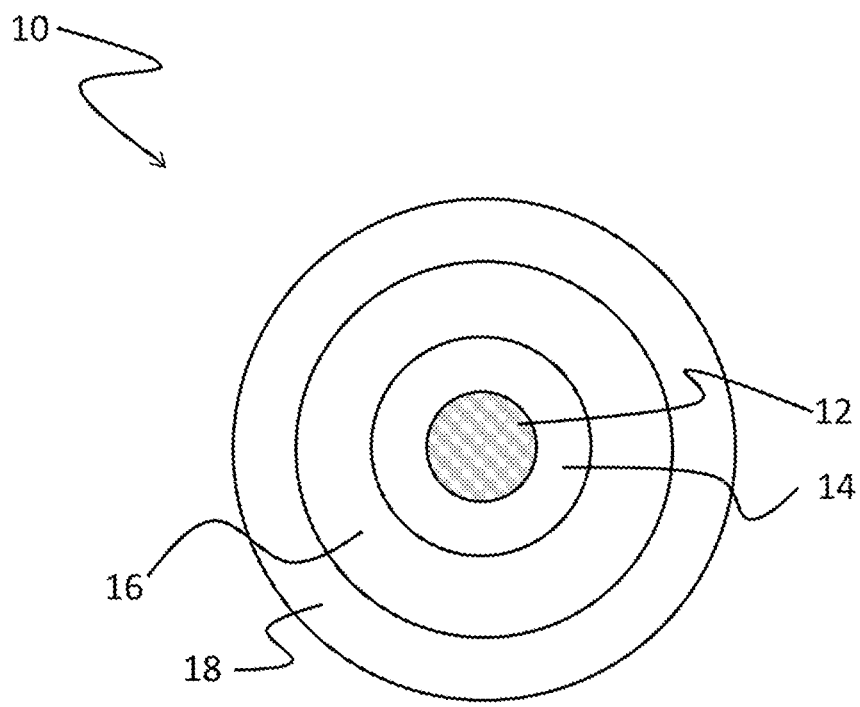
FIG. 1A and FIG. 1B depict illustrative optical fibers in cross section.
Figure 1B:
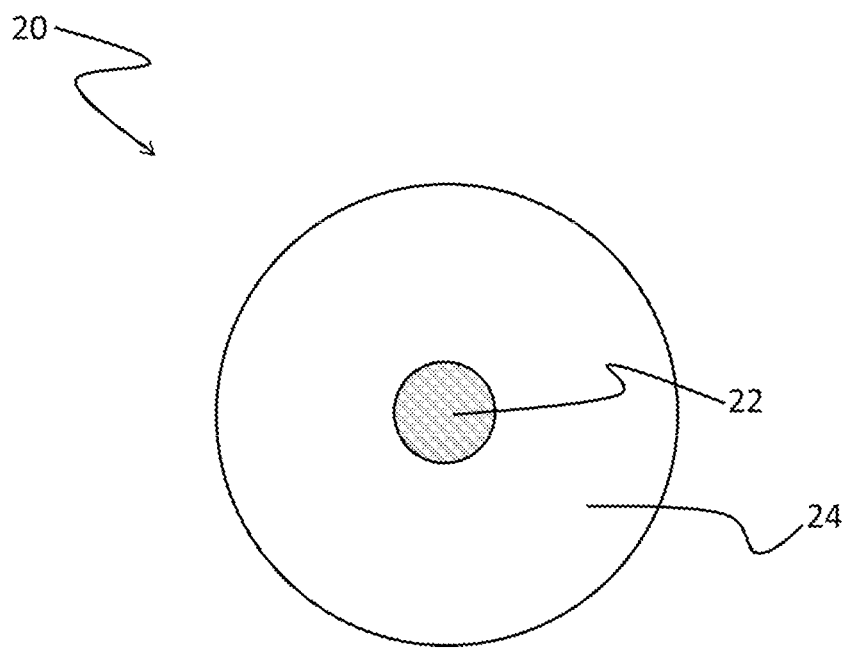

A schematic depiction of optical fibers in accordance with the present disclosure are shown in cross-section in FIGS. 1A and 1B. Optical fiber 10 shown in FIG. 1A includes glass waveguide 12, hybrid cladding 14, primary coating 16 and secondary coating 18. Optical fiber 20 shown in FIG. 1B includes glass wave guide 22 and hybrid cladding 24. Optical fiber 20 lacks primary and secondary coatings and utilizes a hybrid cladding in accordance with the present invention as the sole coating of the fiber.

The hybrid cladding may be formed by curing a composition that may include a monomer, a photoinitiator, and a slip component. The composition from which the hybrid cladding is formed may be referred to herein as the hybrid cladding composition. The hybrid cladding composition may also include an oligomer and/or a photo-acid-generating compound.

Unless otherwise specified or implied herein, the weight percent (wt %) of a particular component in the hybrid cladding composition, primary coating composition, or secondary coating composition refers to the amount of the component present in the curable secondary composition on a basis free of photoacid or additives. Generally, the weight percents of the monomer(s), oligomer(s), slip component(s) and initiator(s) sum to 100%. When present, the amount of a photoacid or an additive is reported herein in units of parts per hundred (pph) relative to the combined amounts of monomer(s), oligomer(s), slip component(s) and initiator(s). An additive present at the 1 pph level, for example, is present in an amount of 1 g for every 100 g of combined monomer(s), oligomer(s), and initiator(s). Representative monomer, oligomer, initiator, slip, photoacid and additive components of the hybrid cladding composition are now described.

The monomer of the hybrid cladding composition may be monofunctional or polyfunctional. A monofunctional monomer has one reactive functional group. A polyfunctional monomer, also referred to in the art as a multifunctional monomer, has two or more reactive functional groups, or three or more reactive functional groups, or four or more reactive functional groups. The reactive functional groups may be capable of participating in a polymerization or crosslinking reaction. The polymerization reaction may be a free radical polymerization reaction, or an addition polymerization reaction. The functional group may be a radiation-curable group. The functional group may include a (meth) acrylate group. As used herein, the term "(meth)acrylate" means acrylate or methacrylate or, in the instance of polyfunctional monomers, a combination of acrylate and methacrylate groups.

Upon curing of the hybrid cladding composition, the monomers may achieve at least about 60% conversion, or at least about 70% conversion, or at least about 80% conversion. Monomers having lower conversion may be included in the hybrid cladding composition, however. The degree to which monomers having lower conversion rates can be introduced into the hybrid cladding composition depends upon the particular characteristics required for the hybrid cladding formed by curing the hybrid cladding composition. For example, higher monomer conversion rates upon curing typically yield stronger hybrid claddings.

Suitable monomeric components of the hybrid cladding composition include ethylenically unsaturated compounds. Ethylenically unsaturated monomers may contain various functional groups, which enable their crosslinking. The ethylenically unsaturated monomers may be monofunctional or polyfunctional. The ethylenically unsaturated group(s) may be radiation curable. Monofunctional ethylenically unsaturated monomers may be introduced to influence the degree to which the hybrid cladding formed from the hybrid cladding composition absorbs water, adheres to other coating materials, or behaves under stress. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

The monomeric component of the hybrid cladding composition may contain one or more the aforementioned monofunctional ethylenically unsaturated monomers in addition to or in the absence of a polyfunctional ethylenically unsaturated monomers.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. and Photomer 4025 and Photomer 4028, available from IGM Resins), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, IGM Resins, and SR499, Sartomer Company, Inc.), propoxylated trimethylolpropane triacrylate with propoxylation being 3 or greater, preferably ranging from 3 to 30 (e.g., Photomer 4072, IGM Resins and SR492, Sartomer Company, Inc.), and ditrimethylolpropane tetraacrylate (e.g., Photomer 4355, IGM Resins and SR355, Sartomer Company, Inc.); alkoxylated glyceryl triacrylates such as propoxylated glyceryl triacrylate with propoxylation being 3 or greater (e.g., Photomer 4096, IGM Resins and SR9020, Sartomer Company, Inc.); erythritol polyacrylates with and without alkoxylation, such as pentaerythritol tetraacrylate (e.g., SR295, available from Sartomer Company, Inc.), ethoxylated pentaerythritol tetraacrylate (e.g., SR494, Sartomer Company, Inc.), pentaerythritol triacrylate (SR444, Sartomer), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate. The monomeric component of the hybrid cladding composition may contain one or more the aforementioned polyfunctional monomers and may also include one or more monofunctional monomers.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

The monomeric component of the hybrid cladding composition may be present in amount from 5-97 wt %, or at least 50 wt %, or at least 70 wt %, or at least 90 wt %. The monomeric component may include two or more monomers, or three or more monomers, or four or more monomers. Combinations of monomers may include monofunctional monomers, polyfunctional monomers, or a combination of monofunctional monomers and polyfunctional monomers.

The hybrid cladding composition may optionally include an oligomeric component. The oligomeric component may include one or more oligomer compounds. If present, the oligomer(s) of the hybrid cladding composition may be monofunctional or polyfunctional. A monofunctional oligomer has one reactive functional group. A polyfunctional oligomer, also referred to in the art as a multifunctional oligomer, has two or more reactive functional groups, or three or more reactive functional groups, or four or more reactive functional groups. The reactive functional groups may be capable of participating in a polymerization or crosslinking reaction. The polymerization reaction may be a free radical polymerization reaction, or an addition polymerization reaction. The functional group may be a radiation-curable group. The functional group may include a (meth)acrylate group. The oligomer may include a urethane linkage or a urea linkage.

The oligomer component of the hybrid cladding composition may include aliphatic urethane (meth)acrylate oligomers, aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The hybrid cladding composition may alternatively be free of urethane groups, urethane acrylate compounds, urethane oligomers, or urethane acrylate oligomers.

The oligomeric component may include a single type of oligomer or a combination of two or more oligomers. The two or more oligomers may be a combination of monofunctional oligomers, a combination of polyfunctional oligomers, or a combination of monofunctional and polyfunctional oligomers.

The oligomeric component the secondary composition may include a difunctional oligomer. A difunctional oligomer may have a structure according to formula (I) below:

$$F_1\text{—}R_1\text{-[urethane-}R_2\text{-urethane]}_m\text{-}R_1\text{—}F_1 \tag{I}$$

where $F_1$ may independently be a reactive functional group such as an ethylenically unsaturated group, acrylate, methacrylate, acrylamide, N-vinyl amide, styrene, vinyl ether, vinyl ester, or other functional group known in the art; $R_1$ may include, independently, $—C_{2-12}O—$, $—(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

multiurethane-$(F_2—R_1—F_2)_x$ (II)

polyol-$[(urethane-R_2-urethane)_m-R_1—F_2]_x$ (III)

multiurethane-$(R_1—F_2)_x$ (IV)

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $—C_{2-12}O—$, $—(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol or polypropylene glycol. The oligomers may have between about four to about ten urethane groups. The oligomer(s) may have a molecular weight of up to about 15,000 g/mol. The molecular weight of the oligomer(s) may range from 2000 g/mol-8000 g/mol.

Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently nonpolar and saturated as to avoid compromising the moisture resistance of the system.

The hybrid cladding composition may include an oligomeric component in an amount from 0 wt % to 90 wt %, or between 0 wt % and 70 wt %, or between 0 wt % and 50 wt %, or between 0 wt % and 30 wt %, or between 0 wt % and 20 wt %, or between 0 wt % and 10 wt %.

The hybrid cladding composition may also contain a polymerization initiator to facilitate polymerization (curing) of the hybrid cladding composition after its application to a glass fiber. Suitable polymerization initiators may include thermal initiators, chemical initiators, electron beam initiators, microwave initiators, actinic-radiation initiators, and photoinitiators. When excited by a suitable wavelength of radiation, the photoinitiator is activated to initiate a reaction. The reaction may be a polymerization reactions and may include stimulating a reaction of a radiation-curable functional group present on a monomer, oligomer, and/or slip component. For many acrylate-based coating formulations, photoinitiators, such as the known ketonic photoinitiating and/or phosphine oxide additives, may be used. When used in the compositions of the present invention, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%. As measured in a dose versus modulus curve, a cure speed for coating thicknesses of about 75 μm may, for example, be less than 1.0 J/cm$^2$ or less than 0.5 J/cm$^2$.

Suitable photoinitiators may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure 651, BASF); bis(2,4,6-trimethylbenzoyl)phenyl phosphine oxide (e.g., Irgacure 819, BASF); (2,4,6-triethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

The slip component of the hybrid cladding composition may include silicon, or silicon and an ethylenically unsaturated group, or silicon and a radiation-curable functional group, or a silicone compound, or a silicone compound with one or more ethylenically unsaturated groups, or a silicone compound with one or more radiation-curable functional groups. The slip component may include a silicone (meth) acrylate compound, or a silicone di(meth)acrylate compound, or a silicone tri(meth)acrylate compound, or a silicone tetra (meth)acrylate compound. Representative slip components include CN990 (an aliphatic urethane acrylate oligomer with bound silicone available from Sartomer), CN9800 (a difunctional aliphatic silone acrylate oligomer available from Sartomer), silicone oil (e.g. DC190 from Dow Corning), and silicone polyether acrylates (e.g. Tego Rad 2200 N, Tego Rad 2250, Tego Rad 2500, Tego Rad 2600 and Tego Rad 2700 from Evonik Industries AG).

The slip component may be oligomeric or polymeric and may be hydrophobic in nature, with the most common examples including silicones (or polysiloxanes), fluoropolymers, and polyolefins. The slip component may include silicones, fluoropolymers, and/or polyolefins in combination with polyesters, polyethers and polycarbonates. Although slip components operate over a wide variety of interfaces, the present invention is particularly concerned with an interface of a glass surface, and in particular, a glass-organic coating interface between the hybrid cladding and the outer surface of the optical glass fiber. A slip component moiety may be covalently incorporated into a composite oligomeric slip component.

The slip component moiety may be the principal component of an oligomeric slip component in terms of weight percent because the slip component moiety may itself be oligomeric in nature, while other components of an oligomeric slip component (e.g. glass coupling moiety and radiation-curable moiety) may be of lower molecular weight. For example, the slip moiety may be up to about 95 wt. % of the total weight of an oligomeric slip component when the three moieties are directly linked together. However, when an oligomeric backbone is present, the slip component usually can be up to about 85 wt. % of the composite oligomer weight. The molecular weight of the slip component moiety is not strictly limited, but will generally be between about 150 g/mol and about 9,500 g/mol, or between about 400 g/mol and about 4500 g/mol.

There is no particular limitation on the molecular architecture of the slip component moiety. The slip component may have a linear, non-linear, or branched structures. Oligomeric slip component moieties, when present, may contain one or more repeat units.

Oligomeric silicone slip component moieties are preferred, and oligomeric silicones comprising substantial portions of methyl side groups are particularly preferred. The side groups preferably impart hydrophobic character to the silicone. Other preferred side groups include ethyl, propyl, phenyl, ethoxy, or propoxy. In particular, dimethylsiloxane repeat units represented by the formula, "—OSi$(CH_3)_2$—" are preferred.

In a preferred embodiment, the end groups on a substantially linear silicone oligomer can be linked with a radiation curable moiety at one end and a slip component moiety at the other end. Such linkage can involve intermediate linkage groups. Although linkage at the silicone oligomer end group is preferred, the silicone moiety can be tailored for linkage with slip component and radiation-curable moieties at other points in the oligomer molecule besides the end groups. For example, functional groups may be incorporated throughout the molecular structure of the silicone oligomer that are linked with the radiation curable and slip component moieties. Examples of functionalized silicones which can be incorporated into the oligomer include polyether, polyester, urethane, amino, and hydroxyl.

Other types of slip component moieties including those made from fluorinated slip components can also be used. Examples of suitable fluorinated slip components include FC-430, FX-13, and FX-189 (Minnesota Mining and Manufacturing), Fluorolink E (Ausimont), and EM-6 (Elf Atochem).

The slip component may influence the strength of adhesion between the hybrid cladding and the primary coating. The slip component may modify the strength of adhesion to permit clean stripping of the primary coating from the hybrid cladding. The slip component may reduce adhesion of the hybrid cladding to the primary coating relative to the adhesion of the corresponding hybrid cladding formed from a composition lacking the slip component.

The slip component may be present in the composition used to form the hybrid cladding in an amount from 1 wt % to 40 wt %, or from 5 wt % to 40 wt %, or from 2 wt % to 30 wt %, or from 5 wt % to 20 wt %, or from 8 wt % to 15 wt %, or about 10 wt %.

The hybrid cladding composition of the present invention may include a photo-acid-generating compound. When exposed to a suitable wavelength of radiation, the photo-acid-generating compound releases an acid group. The suitable wavelength of radiation may be a wavelength that initiates action of the photoinitiator, or a wavelength that is effective to cure the monomer or oligomer of the composition. The suitable wavelength of radiation may cause the photo-acid-generating compound to undergo bond cleavage to release an acid group. The photo-acid-generating compound may not reactively cross-link into the polymerization product of the hybrid cladding composition, either before or after cleavage. Relative to analogous hybrid claddings formed in the absence of a photo-acid-generating compound, the present hybrid cladding may provide greater resistance of the glass fiber to fatigue in stressed or bent configurations.

Photo-acid-generating compounds may include cationic photoinitiators. Suitable cationic photoinitiators may include onium salts such as those that contain halogen complex anions of divalent to heptavalent metals or non-metals, for example, Sb, Sn, Fe, Bi, Al, Ga, In, Ti, Zr, Sc, Cr, Hf, and Cu as well as B, P, and As. Examples of suitable onium salts are diaryl-diazonium salts and onium salts of group Va and B, Ia and B and I of the periodic table; for example, halonium salts, quaternary ammonium, phosphonium and arsonium salts, aromatic sulfonium salts, sulfoxonium salts, and selenium salts. Onium salts have been described in the literature such as in U.S. Pat. Nos. 4,442,197; 4,603,101; and 4,624,912, the disclosures of which are hereby incorporated by reference in their entirety herein.

The onium salt may be one that releases HF or fluoride, or one that does not release HF or fluoride. Examples of onium salts that do not release HF or fluoride include, without limitation, iodonium salts such as iodonium methide, iodonium —C$(SO_2CF_3)_3$, iodonium —B$(C_6F_5)$, and iodonium —N$(SO_2CF_3)_2$.

The anionic portion of the onium salt may include fluorinated (including highly fluorinated and perfluorinated) tris alkyl- or arylsulfonyl methides and corresponding bis alkyl- or arylsulfonyl imides of the type disclosed in U.S. Pat. No. 6,895,156 to Walker, Jr., et al., the disclosure of which is hereby incorporated by reference in its entirety herein. Specific examples of anions useful in the practice of the present invention include, without limitation: $(C_2F_5SO_2)_2N$—, $(C_4F_9SO_2)_2N$—, $(C_8F_{17}SO_2)_3C$—, $(CF_3SO_2)_2N$—, $(C_4F_9SO_2)_3C$—, $(CF_3SO_2)_2(C_4F_9SO_2)C$—, $(CF_3SO_2)(C_4F_9SO_2)N$—, $[(CF_3)_2N]C_2F_4SO_2N$—, $[(CF_3)_2N]C_2F_4SO_2C$—, $(SO_2CF_3)_2(3,5$-bis$(CF_3)C_6H_3)SO_2N$—, $SO_2CF_3$, and the like. Anions of this type, and methods for making them, are described in U.S. Pat. Nos. 4,505,997; 5,021,308; 4,387,222; 5,072,040; 5,162,177; and 5,273,840, and in Turowsky et al., *Inorg. Chem.*, 27:2135-2137 (1988), the disclosure of each of which is hereby incorporated by reference in its entirety herein. Turowsky et al. describe the direct synthesis of the $(CF_3SO_2)C$— anion from $CF_3SO_2F$ and $CH_3MgCl$ in 20% yield based on $CF_3SO_2F$ (19% based on $CH_3MgCl$). U.S. Pat. No. 5,554,664, the disclosure of which is hereby incorporated by reference in its entirety herein, describes a method for synthesizing iodonium methide.

Salts of the above described anions may be activated by radiation. Suitable salts for use as a photo-acid-generated compound may include non-nucleophilic anions or salts that release an acidic group when subjected to sufficient electromagnetic radiation having a wavelength within or over the range from about 200 to 800 nm. The wavelength or wavelengths used to stimulate release of an acidic group from the photo-acid-generating compound may coincide with or overlap the wavelength or wavelengths used to initiate or activate the photoinitiator of the hybrid cladding composition.

An exemplary photo-acid-generating iodonium salt is (4-methylphenyl)[4-(2-methylpropyl) phenyl] iodonium $PF_6$, which is commercially available under the tradename Irgacure 250 (BASF).

The photo-acid-generating compound may be non-ionic. Exemplary classes of non-ionic photo-acid-generating compounds include, without limitation, imidosulfonates; oxime sulfonates; N-oxyimidosulfonates; disulfones including α,α-methylenedisulfones and disulfonehydrazines; diazosulfones; N-sulfonyloxyimides; nitrobenzyl compounds; and halogenated compounds. Exemplary N-sulfonyloxyimide photo-acid-generating compounds include those disclosed in PCT Application Publ. No. WO94/10608, the disclosure of which is hereby incorporated by reference in its entirety herein. Exemplary nitrobenzyl-based photo-acid-generating compounds include those disclosed in EP Application No. 0717319 A1, the disclosure of which is hereby incorporated by reference in its entirety herein. Exemplary disulfone photo-acid-generating compounds include those disclosed in EP Application No. 0708368 A1, the disclosure of which is hereby incorporated by reference in its entirety herein. Exemplary imidosulfonate photo-acid-generating compounds include those disclosed in U.S. Application Publ. No. 20080220597, the disclosure of which is hereby incorporated by reference in its entirety herein. Exemplary oxime sulfonate and N-oxyimidosulfonate photo-acid-generating groups include those disclosed in U.S. Pat. No. 6,482,567, the disclosure of which is hereby incorporated by reference in its entirety herein. Exemplary diazosulfone photo-acid-generating compounds include those disclosed in European Patent Application 0708368 A1 and U.S. Pat. No. 5,558,976, the disclosure of each of which is hereby incorporated by reference in its entirety herein. An exemplary non-ionic photo-acid-generating compound is 8-[2,2,3,3,4,4,5,5-octafluoro-1-(nonafluorobutylsulfonyloxyimino)-pentyl]-fluoranthene, which is commercially available under the tradename PAG121(BASF).

Yet another class of photo-acid-generating compounds may include iron arene complexes. Upon irradiation, the iron arene complex may defragment to a coordinatively unsaturated, iron containing intermediate, which has the characteristics of a Lewis acid. One exemplary iron arene complex is $\eta^5$-2,4-cyclopentadien-1-yl][(1,2,3,4,5,6-η)-(1-methyl ethyl)benzene]-iron(+)-hexafluorophosphate, which is commercially available under the tradename Irgacure 261 (BASF).

The photo-acid-generating compound may be present in an amount from about 0.1 pph to about 10 pph, or from about 0.5 pph up to about 8 pph, or from about 1 pph up to about 7 pph.

The hybrid cladding composition may further include a photosensitizer to promote the activity of the photo-acid-generating compound. The photosensitizer expands the range of wavelengths that may be used to activate the photo-acid-generating compound and allows for the use of broad-wavelength photoinitiation light energy more efficiently. The photosensitizer may be capable of absorbing light at the wavelength(s) used for the selected photoinitiator(s) and then transfer the energy to the photo-acid-generating compound to induce liberation of the acid group. Through the energy transfer process, the photosensitizer may stimulate liberation of the acid group through absorption of wavelengths not directly absorbed by the photo-acid-generating compound. The photosensitizer may be used in an amount of about 0.05 pph up to about 1 pph, or in an amount of about 0.1 pph up to about 0.5 pph.

In addition to the above-described components, the hybrid cladding composition of the present invention may optionally include one or more additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The hybrid cladding composition may include thiodiethylene bis(3,5-di-tert-butyl)-4-hydroxyhydrocinnamate (e.g., Irganox 1035, available from BASF) as an antioxidant.

The hybrid cladding composition may include an adhesion promoter to promote adhesion of the hybrid cladding to the glass portion of the fiber.

Suitable adhesion promoters include acrylated acid adhesion promoters (such as Ebecryl 170 (available from UCB Radcure (Smyrna Ga.)), bis(trimethoxysilylethyl)benzene, methacryloxypropyltrimethoxysilane, 3-mercaptopropyltrimethoxy silane, (commercially available from United Chemical Technologies of Bristol, Pa.), bis(triethoxysilylethyl)-benzene (commercially available from Gelest (Tellytown, Pa.) and United Chemical Technologies, Inc.), and 3-acryloxypropyl trimethoxysilane (commercially available from Gelest). Bis(triethoxysilylethyl)benzene can be synthesized from bis(trimethoxysilylethyl)benzene by trans-esterification with ethanol.

Alternatively the adhesion promoter may be an organic compound which includes at least about one thiol functional group, zirconate group, a titanate group or a halo-alkylsilane compound.

In the case that the adhesion promoter includes a titanate containing compound, suitable compounds include tetra (2, 2 diallyoxymethyl)butyl, di(ditridecyl)phosphito titanate (commercially available as KR 55, from Kenrich Petrochemcials, Inc. (hereinafter Kenrich) Bayonne, N.J.), neopentyl (diallyl)oxy trineodecanonyl titanate (commercially available as LICA 01 from Kenrich), neopentyl(diallyl)oxy tri (dodecyl)benzene-sulfony titanate (commercially available as LICA 09 from Kenrich), neopentyl(diallyl)oxy tri(dioctyl) phosphato titanate (commercially available as LICA 12 from Kenrich), neopentyl(dially)oxy tri(dioctyl)pyro-phosphato titanate (commercially available as LICA38 from Kenrich), neopentyl(diallyl)oxy tri(N-ethylenediamino)ethyl titanate (commercially available as LICA 44 from Kenrich), neopentyl(diallyl)oxy tri(m-amino)phenyl titanate (commercially available as LICA 97 from Kenrich), neopentyl(diallyl)oxy trihydroxy caproyl titanate (formerly available as LICA 99 from Kenrich), and mixtures thereof.

The titanate containing compound may contain at least one UV curable functional group. The UV curable functional group may be a (meth)acrylate functional group.

In case that the adhesion promoter consists of a zirconate containing compound, the zironcate compound may contain at least one ethyleneically unsaturated group or an alkoxy group. Suitable zirconate adhesion promoter include tetra (2, 2 diallyloxymethyl)butyl di(ditridecyl)phosphito zirconate (commercially available as KZ 55 from Kenrich), neopentyl (diallyl)oxy trineodecanoyl zirconate (commercially available as NZ 01 from Kenrich), neopentyl(diallyl)oxy tri(dodecyl)benzene-sulfony zirconate (commercially available as NZ 09 from Kenrich), neopentyl(diallyl)oxy tri(dioctyl) phosphato zirconate (commercially available as NZ 12 from Kenrich), neopentyl(diallyl)oxy tri(dioctyl)pyro-phosphato zirconate (commercially available as NZ 38 from Kenrich), neopentyl(diallyl)oxy tri(N-ethylenediamino)ethyl zirconate (commercially available as NZ 44 from Kenrich), neopentyl (diallyl)oxy tri(m-amino)phenyl zirconate (commercially available as NZ 97 from Kenrich), neopentyl(diallyl)oxy trimethacryl zirconate (commercially available as NZ 33 from Kenrich), neopentyl(diallyl)oxy triacryl zirconate (formerly available as NZ 39 from Kenrich), dineopentyl(diallyl)oxy diparamino benzoyl zirconate (commercially available as NZ 37 from Kenrich), dineopentyl(aiallyl)oxy di(3-mercapto) propionic zirconate (commercially available as NZ 66A from Kenrich), and mixtures thereof.

The zirconate adhesion promoter may include at least one UV curable functional group. The UV curable functional group may be a (meth)acrylate or acrylate functional group.

The adhesion promoter may be present in the hybrid cladding composition in an amount between about 0.1 to about 10 parts per hundred, or between about 0.25 to about 4 parts per hundred, or between about 0.5 to about 3 parts per hundred.

The hybrid cladding may be formed by curing the hybrid cladding composition of the present disclosure. The hybrid cladding may be a thermosetting material.

The hybrid cladding may have a thickness of at least 5 µm, or at least 10 µm, or at least 15 µm, or at least 20 µm, or at least 25 µm, or between 5 µm and 30 µm, or between 10 µm and 25 µm, or between 15 µm and 25 µm.

Important functional characteristics of the hybrid claddings of the present disclosure include Young's modulus, elastic modulus, glass transition temperature, and thermal stability. The hybrid cladding may have high thermal stability and maintain a sufficiently high modulus at customary stripping temperatures to remain intact and undamaged during the stripping operation. Customary stripping temperatures may include temperatures between 50° C. and 225° C., or between 70° C. and 200° C., or between 90° C. and 150° C. The hybrid cladding may have a sufficiently high glass transition temperature to remain rigid and provide a protective function in the conditions of the typical operating environment for the optical fiber.

Young's modulus is a proportionality constant that appears in the stress-strain relationship of a material. It provides a measure of the deformation of a material in response to an applied longitudinal stress (compressive or tensile). The technique for measuring Young's modulus is described in the Examples presented hereinbelow.

The hybrid cladding may have a Young's modulus at 25° C. of at least 1500 MPa, or at least 1800 MPa, or at least 2100 MPa, or at least 2400 MPa, or at least 2700 MPa, or at least 3000 MPa, or between 1800 MPa and 3300 MPa, or between 2100 MPa and 3000 MPa.

DMA (dynamic mechanical analysis) was used to measure the elastic modulus and glass transition temperature of the illustrative hybrid cladding materials described in the Examples presented hereinbelow. The DMA technique is a dynamic measurement of viscoelasticity in the linear strain region (typically strains less than 1%) of the material under investigation. The stress-relaxation of the material can be modeled from the dynamic data. In the DMA technique, the elastic modulus (E') and viscous modulus (E") of a material can be obtained as functions of temperature and time by imposing a sinusoidal stress (or strain) on the material and measuring the resulting strain (or stress) in the material at each of a series of temperatures. As the material is deformed, part of the strain is recovered after the stress is removed. The amplitude of the strain and phase lag δ between stress and strain are measured in the DMA technique. The elastic modulus E' can be obtained from the peak strain amplitude and the viscous modulus E" can be obtained from E' and tan δ since, as is known in the art, tan δ=E"/E'.

To resist damage during fiber stripping, the hybrid claddings of the present disclosure are designed to have a high elastic modulus. The hybrid claddings are further designed to experience smaller variations in elastic modulus with increasing temperature relative to prior art materials. The known hybrid cladding materials experience a decrease in elastic modulus with increasing temperature due to softening of the material. To better preserve mechanical integrity at temperatures commonly employed in fiber stripping, it is desirable to identify hybrid cladding materials that exhibit a minimal decrease in elastic modulus with increasing temperature.

The hybrid cladding of the present disclosure may have an elastic modulus at 25° C. of at least 1200 MPa, or at least 1500 MPa, or at least 1800 MPa, or at least 2100 MPa, or at least 2400 MPa, or at least 2700 MPa, or at least 3000 MPa, or at least 3300 MPa, or between 1300 MPa and 3500 MPa, or between 1300 MPa and 3000 MPa, or between 1300 MPa and 2500 MPa, or between 2100 MPa and 3200 MPa, or between 2200 MPa and 2800 MPa.

The hybrid cladding of the present disclosure may have an elastic modulus at 100° C. of at least 300 MPa, or at least 500 MPa, or at least 700 MPa, or at least 900 MPa, or at least 1200 MPa, or at least 1500 MPa, or at least 1800 MPa, or at least 2100 MPa, or between 300 MPa and 2500 MPa, or between 400 MPa and 2000 MPa, or between 500 MPa and 1700 MPa.

The hybrid cladding of the present disclosure may have an elastic modulus at 150° C. of at least 100 MPa, or at least 200 MPa, or at least 300 MPa, or at least 400 MPa, or at least 500 MPa, or at least 1000 MPa, or at least 1500 MPa, or at least 2000 MPa, or between 100 MPa and 2500 MPa, or between 300 MPa and 1500 MPa, or between 500 MPa and 1000 MPa.

The hybrid cladding of the present disclosure may have an elastic modulus at 200° C. of at least 50 MPa, or at least 100 MPa, or at least 150 MPa, or at least 200 MPa, or at least 250 MPa, or at least 300 MPa, or at least 500 MPa, or at least 1000 MPa, or between 50 MPa and 2000 MPa, or between 100 MPa and 1000 MPa, or between 150 MPa and 800 MPa, or between 150 MPa and 500 MPa.

The hybrid cladding may have a glass transition temperature of at least 40° C., or at least 50° C., or at least 60° C., or at least 70° C., or at least 80° C., or at least 85° C., or at least 90° C., or at least 95° C., or at least 100° C., or at least 105° C.

Tan δ may be regarded as a damping parameter. A low value of tan δ suggests a material with low damping and more elastic response. A hybrid cladding having a low value of tan δ is expected to experience less damage when stressed in the fiber stripping operation. Greater elasticity of the hybrid cladding allows the hybrid cladding to more fully recover from deformations introduced during fiber stripping.

Tan δ is a function of temperature. When the temperature of a material is increased, tan δ increases, reaches a maximum value, and then decreases. The temperature at which tan δ achieves a maximum value is conventionally defined as the glass transition temperature, $T_g$. To resist damage in the fiber stripping operation, the hybrid claddings need to exhibit low tan δ values at the temperature used in the fiber stripping operation. Fiber stripping temperatures may be above 50° C., or above 75° C., or above 100° C., or above 125° C., or above 150° C., or above 175° C., or above 200° C. It is therefore preferable for the hybrid cladding to have a low value of tan δ and to exhibit a small variation in tan δ with temperature.

The hybrid claddings of the present disclosure may have a maximum tan δ of less than 0.30, or less than 0.25, or less than 0.20, or less than 0.15, or less than 0.10, or less than 0.05.

One way to assess the temperature variation of tan δ is to compare the maximum value of tan δ (which occurs at $T_g$) with the value of tan δ at fixed temperature intervals above and below $T_g$. For example, the fixed temperature interval may be 50° C. above $T_g$ and 50° C. below $T_g$. A material with small differences in the value of tan δ at $T_g$−50° C., $T_g$, and $T_g$+50° C. exhibits a weak temperature dependence in tan δ and is expected to exhibit a better elastic response over a wider range of temperatures. In the hybrid claddings of the present disclosure, each of the ratios $$\frac{(\tan\delta)|_{T_g}}{(\tan\delta)|_{T_g-50°\,C.}}$$

$$\frac{(\tan\delta)|_{T_g}}{(\tan\delta)|_{T_g+50°\,C.}}$$

may be less than 9, or less than 7, or less than 5, or less than 3.

The thermal stability of the hybrid cladding may be assessed by the weight loss it experiences when exposed to high temperatures. The weight loss is a measure of the extent of thermal decomposition of the hybrid cladding and may be measured in a TGA (thermogravimetric analysis) experiment. In a TGA experiment in which the hybrid cladding is heated in air at 10° C./minute from ambient temperature to 700° C., the weight loss of the hybrid cladding of the present disclosure may be 10% or less at a temperature of up to 330° C., or a temperature up to 345° C., or a temperature up to 360° C. In a TGA experiment in which the hybrid cladding is heated in air at 10° C./minute from ambient temperature to 700° C., the weight loss of the hybrid cladding of the present disclosure may be 20% or less at a temperature of up to 360° C., or a temperature up to 380° C., or a temperature up to 400° C. In a TGA experiment in which the hybrid cladding is heated in air at 10° C./minute from ambient temperature to 700° C., the weight loss of the hybrid cladding of the present disclosure may be 30% or less at a temperature of up to 380° C., or a temperature up to 400° C., or a temperature up to 420° C.

The primary coating may function to dissipate external forces applied to the fiber to protect the fiber from damage or stress-induced interference with optical transmission characteristics. The outer diameter of the primary coating may be about 180 µm, or about 185 µm, or about 190 µm, or about 195 µm, or about 200 µm. The primary coating may have a lower Young's modulus than the hybrid cladding. The Young's modulus of the primary coating at ambient temperature may be less than 10 MPa, or less than 5 MPa, or less than 2.5 MPa, or less than 1 MPa. The primary coating may be formed from a radiation-curable composition. The radiation-curable composition may include monomers and/or oligomers. The monomers and/or oligomers may include one or more radiation-curable (meth)acrylate groups. Representative primary coatings and compositions are described in U.S. Published Patent Appl. No. 20110300367, the disclosure of which is incorporated by reference in its entirety herein.

The secondary coating may function to protect the fiber from external forces. The outer diameter of the secondary coating may be about 210 µm, or about 220 µm, or about 230 µm, or about 240 µm, or about 250 µm. The secondary coating may have a higher Young's modulus than the primary coating and/or the hybrid cladding. The Young's modulus of the secondary coating at ambient temperature may be greater than 500 MPa, or greater than 1000 MPa, or greater than 1250 MPa, or greater than 1500 MPa, or greater than 1750 MPa. The secondary coating may be formed from a radiation-curable composition. The radiation-curable composition may include monomers and/or oligomers. The monomers and/or oligomers may include one or more radiation-curable (meth)acrylate groups. The oligomers may include urethane or urea groups. Representative secondary coatings and compositions are described in U.S. Published Patent Appl. No. 20110300367, the disclosure of which is incorporated by reference in its entirety herein.

Inclusion of the slip component in the hybrid cladding composition facilitates removal of the primary and secondary coatings during the fiber stripping operation. In the fiber stripping process, the primary and secondary coatings may be removed from the hybrid cladding by effecting a separation of the primary coating from the hybrid cladding at the interface between the two. A hybrid cladding formed from a composition with the slip component as described herein may adhere less strongly to the primary coating than would a hybrid cladding formed from a corresponding hybrid cladding composition that omits the slip component. The reduced adhesion achieved through incorporation of the slip component may lower the force required to separate the primary coating from the hybrid cladding relative to a hybrid cladding formed from a corresponding hybrid cladding composition that omits the slip component. The reduction in force may be greater than 25%, or greater than 40%, or greater than 50%, or greater than 60%.

The strength of adhesion of the primary coating with the hybrid cladding may be quantified in terms of a pullout force. The pullout force is the force required to separate the primary coating (which may also be surrounded by a secondary coating) from the hybrid cladding. The pullout force may be measured by affixing the ends of a section of fiber to tabs and connecting the tabs to a force-generating instrument that pulls the tabs apart. The applied force is recorded by the instrument and increased until the primary coating separates from the hybrid cladding. Typically the primary (and secondary) coating is nicked at one end of the fiber section at the outset of the experiment. The hybrid cladding is not nicked. The pullout force required to separate the primary coating from the hybrid cladding of the present disclosure may be less than 12 N, or less than 10 N, or less than 8 N, or less than 6 N, or less than 4 N, or between 2 N and 12 N, or between 3 N and 10 N, or between 4 N and 7 N.

The hybrid cladding composition, primary coating composition, and secondary composition may be applied as coatings to the outer surface of the glass waveguide portion of the fiber using conventional processes, such as on a draw tower. In the drawing process, a specially prepared, cylindrical glass optical fiber preform is locally and symmetrically heated to a temperature of about 2000° C. The preform may be heated by feeding it into and through a furnace. As the preform is heated, a glass optical fiber may be drawn from the molten material. The hybrid cladding, primary and secondary compositions may be applied to the glass fiber after it has been drawn from the preform, including immediately after cooling. The compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It is frequently advantageous from a process efficiency standpoint to apply all three compositions in sequence following the draw process. The hybrid cladding composition is first applied to the glass waveguide, the primary coating composition is then applied to the hybrid cladding composition, and the secondary coating composition is then applied to the primary coating composition. Each composition may be applied on the preceding composition before or after the preceding composition has been cured. Methods of applying multiple layers of curable compositions to a moving glass fiber are disclosed in U.S. Pat. Nos. 4,474,830 and 4,585,165, the disclosures of which are hereby incorporated by reference herein.

The optical fibers disclosed herein may be configured as an optical fiber ribbon that includes two or more substantially aligned and substantially co-planar optical fibers encapsulated by a matrix material. The matrix material may be a single layer material or a multilayer material. Representative matrix materials include polymers (e.g. polyvinyl chloride), thermoplastics, or materials compatible for use as secondary fiber coatings.

EXAMPLES

The following examples illustrate the benefits available from the hybrid cladding of the present disclosure.

The hybrid cladding compositions used to form the hybrid claddings tested in these examples are listed in Table 1:

BASF) and functions as a photoinitiator, Lucirin TPO is (2,4,6-trimethylbenzoyl)diphenylphosphine oxide (commercially available from BASF), Irganox 1035 is thiodiethylene bis(3,5-di-tert-butyl)-4-hydroxyhydrocinnamate (commercially available from BASF) and functions as an antioxidant, Irgacure 250 is (4-methylphenyl)(4-(2-methylphenyl)phenyl)iodonium hexafluorophosphate (commercially available from BASF) and functions as a photoacid, ITX is isopropylthioxanthone (commercially available from Rahn AG) and functions as a photosensitizer, SIA 200 is 3-acryloxypropyl trimethoxysilane (commercially available from Gelest) and functions as an adhesion promoter, and 9,10-diethoxyanthracene (commercially available from Fisher Scientific) is a photosensitizer.

In the hybrid cladding compositions, the numerical values refer to the amount of each component in the composition. The amounts for KWS 4131, CN9800, Photomer 3016, Photomer 4072, SR355, SR444, Irgacure 184, Irgacure 819, and Lucirin TPO are listed in units of wt %. The amounts for Irganox 1035, Irgacure 250, ITX, SIA 200, and 9,10-diethoxyanthracene are listed in units of pph.

The hybrid cladding applied to fiber sample 1 is a control cladding from the prior art. The hybrid cladding applied to fiber sample 2 exhibited a high modulus at high temperatures and good fatigue resistance, but adhered too strongly to the primary coating to permit clean fiber stripping. The hybrid claddings applied to fiber samples 3-10 were modified to include a silicone diacrylate slip component. Variations in monomers, photoinitiators, and/or photosensitizers were also made in the compositions used to form the hybrid claddings of fiber samples 3-10.

The Young's modulus, elastic modulus and glass transition temperature $T_g$ of rods formed by curing hybrid cladding compositions 1-10 were measured. Rods were prepared by injecting the curable hybrid cladding compositions into a Teflon® tube having an inner diameter of about 0.022". After injection, the hybrid cladding composition was cured using a Fusion D bulb at a dose of about 2.4 J/cm² (measured over a

TABLE 1

Hybrid Cladding Compositions

| Component | Description | 1 | 2 | 3 | 4 | 5 | 6 | 7 | 8 | 9 | 10 |
|---|---|---|---|---|---|---|---|---|---|---|---|
| KWS 4131 | Polyether urethane acrylate oligomer | 10 | | | | | | | | | |
| CN9800 | Silicone diacrylate | | | 10 | 10 | 10 | 10 | 10 | 30 | 10 | 10 |
| Photomer 3016 | Bisphenol A epoxy diacrylate | 5 | 35 | 31.4 | 31.2 | 32 | 32 | 18 | 14 | | |
| Photomer 4072 | Trimethylolpropane [3PO] triacrylate | 82 | 37 | 33.2 | 33 | 33 | 33 | | | | |
| SR355 | Di-trimethlolpropane tetraacrylate | | | | | | | 24 | 18 | 88 | |
| SR444 | Pentaerethriol triacrylate | | 25 | 22.4 | 22.3 | 23 | 23 | 45 | 35 | | 87 |
| Irgacure 184 | Photoinitiator | 1.5 | 1.5 | 1.5 | 1.5 | | | | | | |
| Irgacure 819 | Photoinitiator | | 1.5 | 1.5 | | | | | | | |
| Lucirin TPO | Photoinitiator | 1.5 | | | 2 | 2 | 2 | 3 | 3 | 2 | 3 |
| Irganox1035 | Stabilizer | 0.5 | 0.5 | 0.5 | 0.5 | 0.5 | 0.5 | 0.5 | 0.5 | 0.5 | 0.5 |
| Irgacure 250 | Photoacid | 1 | 1 | 1 | 1 | 1 | 1 | 1 | 1 | 1 | 1 |
| ITX | Photosensitizer | 0.2 | 0.2 | 0.2 | 0.2 | 0.2 | | | | | |
| SIA 200 | Acrylate silane | 1 | 1 | 1 | | | | | | | |
| 9,10 Diethoxyanthracene | Photosensitizer | | | | | | 0.10 | 0.15 | 0.15 | 0.15 | 0.15 |

In the hybrid cladding compositions, KWS 4131 is a polyether urethane acrylate oligomer (commercially available from Dymax), CN9800 is silicone diacrylate (commercially available from Sartomer) and functions as a slip component, Photomer 3016 is bisphenol A epoxy diacrylate monomer (commercially available from IGM Resins), Photomer 4072 is propoxylated(3)trimethylol triacrylate monomer (commercially available from IGM Resins or as SR492 from Sartomer), SR 355 is di-trimethylolpropane tetraacrylate monomer (commercially available from Sartomer), SR 444 is pentaerythritol triacrylate monomer (commercially available from Sartomer), Irgacure 184 is 1-hydroxycyclohexyl phenyl ketone (commercially available from BASF) and functions as a photoinitiator, Irgacure 819 is bis(2,4,6-trimethylbenzoyl) phenyl phosphine oxide (commercially available from wavelength range of 225-424 nm by a Light Bug model IL390 from International Light). After curing, the Teflon® tubing was stripped away to provide rod samples of the hybrid cladding composition. The cured rods were allowed to condition overnight at 23° C. and 50% relative humidity.

The Young's modulus was measured using a tensile testing instrument (e.g., a Sintech MTS Tensile Tester, or an Instron Universal Material Test System) on defect-free rod samples with a gauge length of 51 mm, and a test speed of 250 mm/min. The properties were determined as an average of at least five samples, with defective samples being excluded from the average.

DMA (dynamic mechanical analysis) was used to measure the elastic modulus and glass transition temperature of cured rods formed from the hybrid cladding compositions. Glass transition temperatures were measured by determining the peak of the tan δ curves obtained from an instrument such as a TA Q800 Dynamic Mechanical Analyzer. The rod samples used for the measurements were approximately 0.5 mm in diameter and 10 mm in length. The measurements were performed with an oscillatory strain of 0.07% on a pre-straining force of 0.01 N. The scan frequency was 1 Hz and the temperature was ramped from −50° C. to 200° C. at a rate of 2° C./min.

The amplitude of the strain and phase lag δ between stress and strain are measured in the DMA technique. The elastic modulus E' can be obtained from the peak strain amplitude and the viscous modulus E" can be obtained from E' and tan δ peak. Tg is defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation.

The Young's modulus, elastic modulus, and $T_g$ of cured rods prepared from each of the hybrid cladding compositions listed in Table 1 are presented in Table 2. The hybrid claddings are identified by the numerical label used in Table 1 for the hybrid cladding composition used to form each hybrid cladding. Hybrid cladding 1 of Table 2 was prepared by curing hybrid cladding compositions 1 of Table 1, etc. Table 2 also lists the maximum value of tan δ (tan δ at $T_g$) as well as the ratio of the maximum tan δ to the value of tan δ at $T_g$−50° C. and the ratio of the maximum tan δ to the value of tan δ at $T_g$+50° C. for each hybrid cladding.

Figure 2:
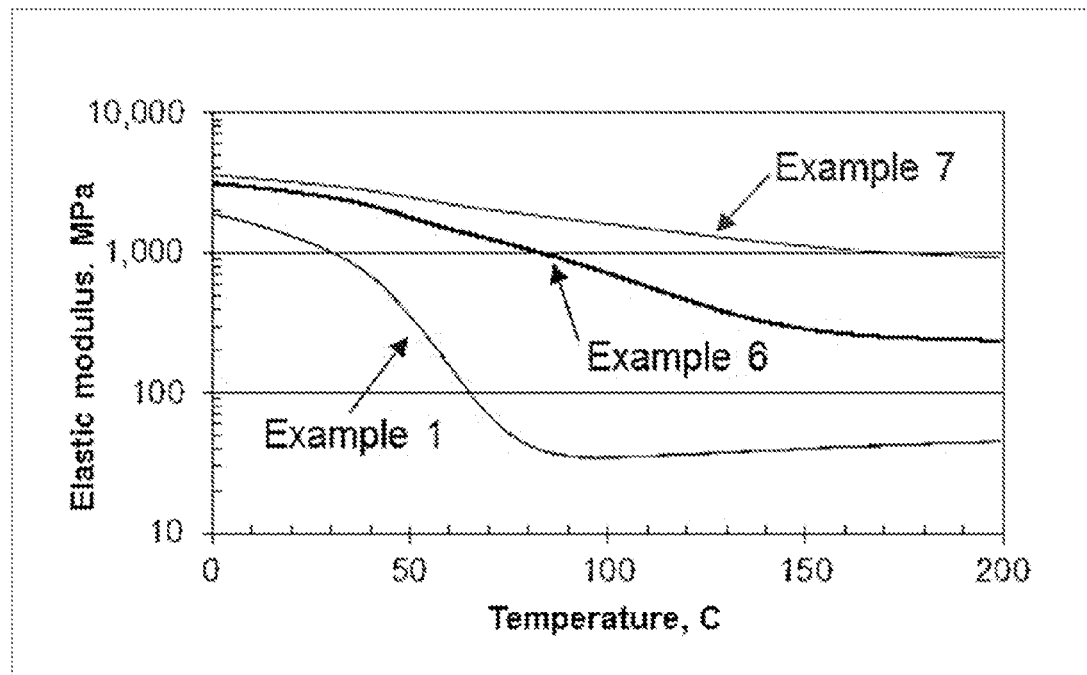
FIG. 2 shows the dependence of elastic modulus on temperature for comparative hybrid cladding 1 and hybrid claddings 6 and 7 of the present disclosure.

The results indicate that hybrid claddings 3-10 of the present disclosure exhibit significantly smaller decreases in elastic modulus with increasing temperature than does comparative hybrid cladding 1. A comparison of the dependence of elastic modulus on temperature for comparative hybrid cladding 1 and hybrid claddings 6 and 7 of the present disclosure is presented in FIG. 2. Hybrid claddings 3-10 also exhibit much smaller maximum values of tan δ and much smaller ratios of the maximum tan δ to the value of tan δ at either $T_g$−50° C. or $T_g$+50° C. than does comparative cladding 1. These results demonstrate that hybrid claddings 3-10 are more elastic and less susceptible to damage at the elevated temperatures commonly encountered in the fiber stripping operation.

Fibers were prepared for pullout testing using hybrid claddings 1 and 3. fiber For each of the fibers, the diameter of the central glass region was 100 μm, the outer diameter of the hybrid cladding was 125 μm, the outer diameter of the primary coating was 190 μm, and the outer diameter of the secondary coating was 242 μm.

The fibers were prepared in a conventional drawing process. During the drawing, the curable hybrid cladding, primary coating, and secondary coating compositions were applied and cured with UV radiation. The drawing station was equipped with UV lamps to cure the compositions to form the hybrid cladding, primary coating and secondary coating.

The primary coating composition, primary coating, secondary coating composition, and secondary coating used for the fiber samples of were the same and are described in U.S. Published Patent Appl. No. 20110300367. The components of the primary coating composition and secondary coating composition are summarized below:

| Primary Coating Composition | |
| --- | --- |
| Component | Amount |
| BR3741 | 52 wt % |
| Photomer 4003 | 41.5 wt % |
| Caprolactone acrylate | 5 wt % |
| Irgacure 819 | 1.5 wt % |
| Irganox 1035 | 1.0 pph |
| 3-acryloxypropyl trimethoxysilane | 1.0 pph |
| Pentaerythritol tetrakis-(3-mercaptopropionate) | 0.032 pph |

TABLE 2

Young's Modulus, Elastic Modulus, $T_g$, and Tan δ of Hybrid Claddings

| | Hybrid Cladding | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Young's Modulus (MPa) | 1489 | 2974 | 2132 | 2458 | 2220 | 2529.8 | 2852 | 1802 | 2812 | 3233 |
| Elastic modulus (MPa) | | | | | | | | | | |
| @25° C. | 1570 | 3302 | 2278 | 2614 | 2707 | 2629 | 3119 | 2056 | 3545 | 3467 |
| @100° C. | 41.9 | 970 | 697 | 606 | 634 | 731 | 1609 | 759 | 2241 | 2281 |
| @150° C. | 48.2 | 395 | 336 | 229 | 228 | 288 | 1118 | 448 | 1946 | 2084 |
| @200° C. | 55 | 305 | 279 | 205 | 202 | 236 | 924 | 383 | 1830 | 1988 |
| Tg (° C.) | | 109 | 100.4 | 103 | 105.4 | 109.3 | 87.8 | 86.7 | 66 | 59.4 |
| maximum tan δ | 0.4184 | 0.1271 | 0.1194 | 0.1474 | 0.1457 | 0.1340 | 0.0656 | 0.0929 | 0.0461 | 0.0508 |
| tan δ ratio $T_g/T_g$ − 50° C. | 9.19 | 1.446 | 1.372 | 1.500 | 1.552 | 1.861 | 1.525 | 1.530 | 1.317 | 1.212 |
| tan δ ratio $T_g/T_g$ + 50° C. | 85.73 | 2.330 | 2.053 | 2.913 | 2.849 | 1.666 | 1.218 | 1.426 | 1.359 | 1.370 |

| Secondary Coating Composition | |
|---|---|
| Component | Amount |
| KWS 4131 | 10 wt % |
| Photomer 4028 | 82 wt % |
| Photomer 3016 | 5 wt % |
| Irgacure 184 | 1.5 wt % |
| Lucirin TPO | 1.5 wt % |
| Irganox 1035 | 0.5 pph |

In the primary coating composition: BR3741 is a polyether urethane acrylate oligomer (commercially available from Dymax), Photomer 4003 is ethoxylated (4) nonylphenol acrylate monomer (commercially available from Dymax), Irgacure 819 is bis(2,4,6-trimethylbenzoyl)phenyl phosphine oxide (commercially available from BASF) and functions as a photoinitiator, Irganox 1035 is thiodiethylene bis(3,5-di-tert-butyl)-4-hydroxyhydrocinnamate (commercially available from BASF) and functions as an antioxidant, 3-acryloxypropyl trimethoxysilane (commercially available from Gelest) functions as an adhesion promoter, pentaerythritol tetrakis(3-mercaptopropionate) (commercially available from Aldrich) functions as a strength additive.

Figure 3:
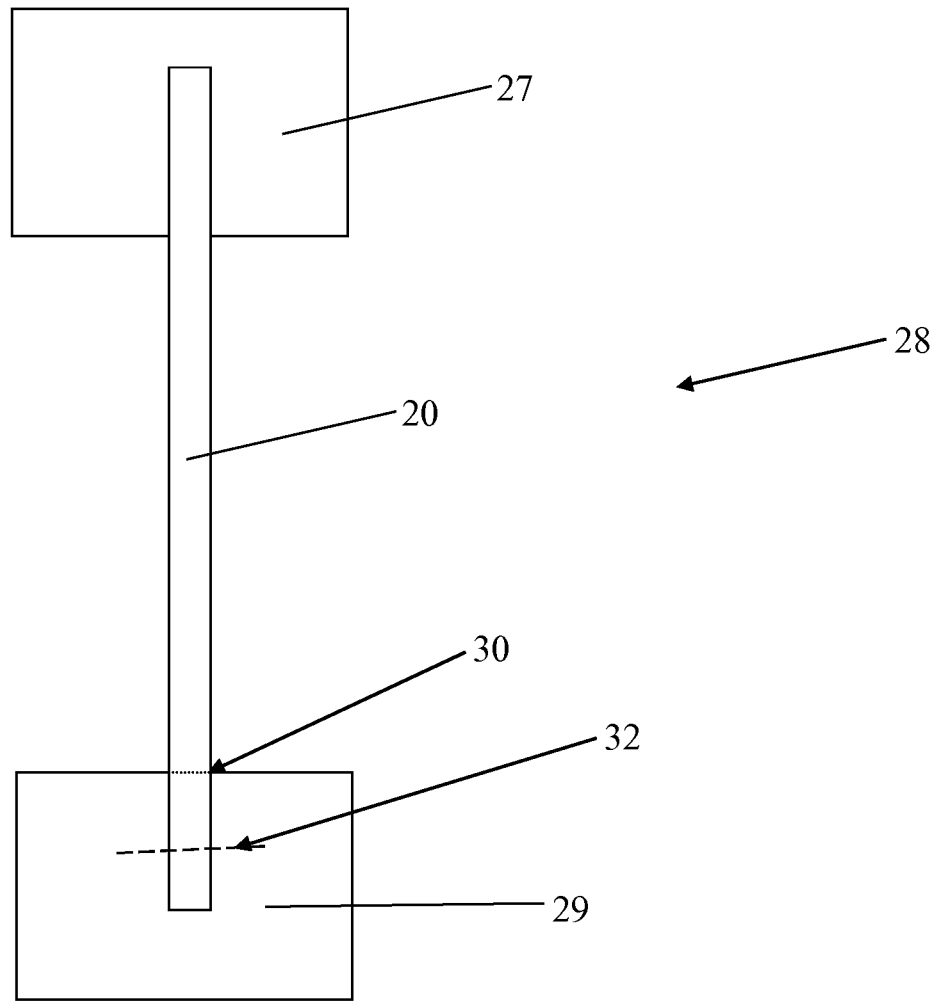
FIG. 3 depicts an apparatus for performing a fiber pullout test of adhesion.

In the secondary coating composition: KWS 4131 is a polyether urethane acrylate oligomer (commercially available from Dymax), Photomer 4028 is ethoxylated (4) bisphenol A diacrylate monomer (commercially available from IGM Resins), Photomer 3016 is bisphenol A epoxy diacrylate monomer (commercially available from IGM Resins), Irgacure 184 is 1-hydroxycyclohexyl phenyl ketone (commercially available from BASF) and functions as a photoinitiator, Lucirin TPO is (2,4,6-trimethylbenzoyl)diphenylphosphine oxide (commercially available from BASF), and Irganox 1035 is thiodiethylene bis(3,5-di-tert-butyl)-4-hydroxyhydrocinnamate (commercially available from BASF) and functions as an antioxidant. A pullout test was completed on sections of the fibers prepared with hybrid claddings 1 and 3 to assess the influence of inclusion of the present slip component in the hybrid cladding composition on adhesion to the primary coating. The methodology used to perform the fiber pull out test is shown in FIG. 3. To conduct the fiber pull out test, apparatus 28 was used. The ends of fiber section 20 were glued with cyanoacrylate glue to flat metal tabs 27 and 29. End 32 of the affixed fiber was then cut off so that the length of contact of end 32 with flat metal tab 29 was 1 cm. After cutting, the primary and secondary coatings at end 32 were nicked on one side of fiber section 20 at edge 30 of flat metal tab 29 surface so that the nick only penetrated into the primary/secondary coating without reaching the hybrid cladding. The flat metal tabs 27 and 29 were then inserted into a tensile tester pulled axially apart at a rate of 5 mm/min. The force was measured as the tabs were pulsed apart. The pullout force was defined as maximum force reached during the axial pull. The pullout force measured for the fiber sample that included comparative hybrid cladding 1 was 15.84 N and the pullout force measured for the fiber sample that included hybrid cladding 3 of the present disclosure was 4.27 N. The results indicated that inclusion of the silicone diacrylate slip component led to a significant decrease in pullout force. The reduction in pullout force is a consequence of lower adhesion of hybrid cladding 3 to the primary coating relative to comparative hybrid cladding 1.

Fiber stripping tests were conducted on different sections of the fibers used in the pullout force measurements. Sections of fibers containing comparative hybrid cladding 1 and hybrid cladding 3 of the present disclosure were thermally stripped with a Soft-Strip stripper (manufactured by Micro-Electronics). The fiber sections were mounted in the Soft-Strip stripper and heated. The temperature of the fiber section increased with increasing hold time in the Soft-Strip stripper. Separate trials were conducted at heating temperatures of 70° C. (hold time of 3 seconds) and 150° C. (hold time of 7 seconds). The performance of each fiber section was evaluated on a rating scale with rating values from 1 to 5, where a rating of 5 corresponds to the best performance in the stripping test. A rating of 5 indicates clean stripping of the primary and secondary coatings from the hybrid cladding without damage to the hybrid cladding and without the presence of residue from the primary coating on the hybrid cladding. A rating of 1 indicates that the stripping operation resulted in serious damage to the hybrid cladding and/or significant residue from the primary coating on the hybrid cladding. The results of the fiber strip test are shown in Table 3 below and demonstrate that the fiber section with a hybrid cladding that included a slip component in accordance with the present disclosure provided far superior performance at both stripping temperatures.

TABLE 3

Fiber stripping performance at 70° C. and 150° C.

| | Fiber Strip Temperature | |
|---|---|---|
| Hybrid Cladding | 70° C. | 150° C. |
| 1 | 2.4 | 2 |
| 3 | 5 | 5 |

The thermal stability of cured films formed from comparative commercial coating composition (DF-0009 from DSM (Elgin, Ill.)) and hybrid cladding compositions 7, 8, 9, and 10 of the present disclosure was determined. Films were formed by curing the respective hybrid cladding compositions in $N_2$ with UV radiation having an energy density of 1 joule/cm$^2$. Thermal stability was characterized in terms of weight loss as determined by TGA (thermal gravimetric analysis). In the TGA procedure, the film samples were heated in air at 10° C./minute from ambient temperature to 700° C. and changes in weight were recorded. Thermal stability was quantified as the temperatures (in units of ° C.) at which weight losses of 10%, 20% and 30% were observed. The higher the temperature at which a particular weight loss was observed, the greater the thermal stability of the hybrid cladding. The results of the thermal stability measurements are shown in Table 4 below. The results indicate that much higher temperatures were needed to induce weight loss in films formed from hybrid cladding compositions 7, 8, 9, and 10 of the present disclosure than were needed for the film formed from comparative commercial coating composition. Thermal stability is significantly improved in hybrid cladding compositions in accordance with the present disclosure.

TABLE 4

Thermal stability test results (° C.)

| | Hybrid Cladding Composition | | | | Comparative |
|---|---|---|---|---|---|
| | 7 | 8 | 9 | 10 | Commercial |
| 10% weight loss | 373 | 331 | 390 | 388 | 334 |
| 20% weight loss | 407 | 368 | 421 | 420 | 358 |
| 30% weight loss | 432 | 395 | 441 | 442 | 375 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
    a glass waveguide fiber;
    a hybrid cladding surrounding said glass waveguide fiber, said hybrid cladding comprising the cured product of a composition that includes:
       a monomer, said monomer comprising a radiation-curable functional group;
       a photoinitiator; and
       a slip component, said slip component comprising silicon and an ethylenically unsaturated group, wherein said hybrid cladding has an elastic modulus of between 1300 MPa and 3500 MPa at 25° C., between 300 MPa and 2500 MPa at 100° C., and between 100 MPa and 2500 MPa at 150° C.

2. The optical fiber of claim 1, wherein said radiation-curable functional group includes a (meth)acrylate group.

3. The optical fiber of claim 2, wherein said ethylenically unsaturated group includes a (meth)acrylate group.

4. The optical fiber of claim 3, wherein said slip component includes a silicone di(meth)acrylate compound.

5. The optical fiber of claim 4, wherein said silicone di(meth)acrylate compound is present in said composition in an amount from 1 wt % to 40 wt %.

6. The optical fiber of claim 1, wherein said composition further includes an oligomer, said oligomer including a (meth)acrylate group, said oligomer being present in said composition in an amount less than 30 wt %.

7. The optical fiber of claim 1, wherein said composition further includes a photo-acid-generating compound, said photo-acid-generating compound releasing an acid group when excited by a suitable wavelength of radiation, said photo-acid-generating compound comprising an onium salt, an iron arene complex, or a non-ionic compound, said photo-acid-generating compound being present in said composition in an amount from 0.1 pph to 10 pph.

8. The optical fiber of claim 1, wherein said hybrid cladding has an elastic modulus of between 1300 MPa and 3000 MPa at 25° C., between 400 MPa and 2000 MPa at 100° C., and between 300 MPa and 1500 MPa at 150° C.

9. The optical fiber of claim 1, wherein said hybrid cladding has a tan δ value at its glass transition temperature of less than 0.30.

10. The optical fiber of claim 9, wherein said hybrid cladding satisfies the conditions:

$$\frac{(\tan\delta)|_{T_g}}{(\tan\delta)|_{T_g-50°\,C.}} < 9$$

$$\frac{(\tan\delta)|_{T_g}}{(\tan\delta)|_{T_g+50°\,C.}} < 9.$$

11. The optical fiber of claim 1, wherein said hybrid cladding experiences a weight loss of 10% or less at a temperature of up to 330° C., a weight loss of 20% or less at a temperature of up to 360° C., and a weight loss of 30% or less at a temperature of up to 380° C. in a TGA experiment in which said hybrid cladding is heated in air at 10° C./minute from ambient temperature.

12. The optical fiber of claim 1, wherein said hybrid cladding experiences a weight loss of 10% or less at a temperature of up to 345° C., a weight loss of 20% or less at a temperature of up to 380° C., and a weight loss of 30% or less at a temperature of up to 400° C. in a TGA experiment in which said hybrid cladding is heated in air at 10° C./minute from ambient temperature.

13. The optical fiber of claim 1, wherein said hybrid cladding experiences a weight loss of 10% or less at a temperature of up to 360° C., a weight loss of 20% or less at a temperature of up to 400° C., and a weight loss of 30% or less at a temperature of up to 420° C. in a TGA experiment in which said hybrid cladding is heated in air at 10° C./minute from ambient temperature.

14. The optical fiber of claim 1, wherein said hybrid cladding has an outer radius of between 100 μm and 122.5 μm.

15. The optical fiber of claim 1, further comprising a primary coating, said primary coating surrounding and directly contacting said hybrid cladding, said primary coating being formed from a radiation-curable monomer and having a Young's modulus at ambient temperature of less than 2.5 MPa.

16. The optical fiber of claim 15, further comprising a secondary coating, said secondary coating surrounding and directly contacting said primary coating, said secondary coating being formed from a radiation-curable monomer and having a Young's modulus at ambient temperature of greater than 1250 MPa.

17. The optical fiber of claim 16, wherein the pullout force required to separate said primary coating from said hybrid cladding is less than 10 N.

* * * * *